(12) United States Patent
Fafore et al.

(10) Patent No.: US 12,719,815 B2
(45) Date of Patent: Aug. 25, 2026

(54) APPARATUSES AND METHODS FOR FACILITATING A MULTI-ENVIRONMENT EVENT INFRASTRUCTURE MANAGER

(71) Applicants: AT&T Intellectual Property I, L.P., Atlanta, GA (US); Interwise Ltd., Ben-Gurion Airport (IL)

(72) Inventors: Michael Fafore, Chicago, IL (US); Kashif Eijaz, Matawan, NJ (US); Sanjay Agraharam, Marlboro, NJ (US); Steven Polston, Southaven, MS (US); David Khanin, Ashdod (IL)

(73) Assignees: AT&T Intellectual Property I, L.P., Atlanta, GA (US); Interwise Ltd., Ben-Gurion Airport (IL)

( * ) Notice: Subject to any disclaimer, the term of this patent is extended or adjusted under 35 U.S.C. 154(b) by 95 days.

(21) Appl. No.: 18/500,145

(22) Filed: Nov. 2, 2023

(65) Prior Publication Data

US 2025/0150410 A1 May 8, 2025

(51) Int. Cl.
*H04L 47/83* (2022.01)
*H04L 9/40* (2022.01)
*H04L 47/70* (2022.01)

(52) U.S. Cl.
CPC ............ *H04L 47/83* (2022.05); *H04L 47/822* (2013.01); *H04L 63/102* (2013.01)

(58) Field of Classification Search
CPC ...... H04L 47/83; H04L 47/822; H04L 63/102
USPC .......................................................... 709/206
See application file for complete search history.

(56) References Cited

U.S. PATENT DOCUMENTS

| | | | | |
|---|---|---|---|---|
| 9,202,225 | B2 * | 12/2015 | Ferris | G06Q 40/12 |
| 10,469,327 | B1 * | 11/2019 | Velmurugan | H04L 67/025 |
| 11,150,957 | B1 * | 10/2021 | Ferreira | G06F 3/0484 |
| 2008/0066051 | A1 * | 3/2008 | Stubbs | G06F 8/20 717/107 |
| 2021/0105624 | A1 * | 4/2021 | Sardesai | H04W 4/50 |
| 2023/0141418 | A1 * | 5/2023 | Shetty | H04L 67/34 718/100 |
| 2023/0281100 | A1 * | 9/2023 | Wells | G06F 11/3006 702/186 |
| 2024/0160491 | A1 * | 5/2024 | Taneja | G06Q 10/0631 |

OTHER PUBLICATIONS

Buyya et al., "InterCloud: Utility-Oriented Federation of Cloud Computing Environments for Scaling of Application Services", Arxiv, Proceedings of the 10th International Conf on Algorithms and Architectures for Parallel Processing (ICA3PP 2010, Busan, South Korea, May 21-23, 2010), 2010 (Year: 2010).*

(Continued)

*Primary Examiner* — Taylor A Elfervig
(74) *Attorney, Agent, or Firm* — Guntin & Gust, PLC; Mark Wilinski

(57) ABSTRACT

Aspects of the subject disclosure may include, for example, obtaining a request pertaining to an onboarding of an application supporting a communication network or system, based on the obtaining of the request, establishing a profile for the application, selecting first resources of a first cloud computing network to support the application, based on the selecting of the first resources, configuring at least one resource of the first resources based on the profile, and deploying a first instance of the application to utilize the first resources. Other embodiments are disclosed.

20 Claims, 7 Drawing Sheets

(56) References Cited

OTHER PUBLICATIONS

A. Carrega, M. Repetto, P. Gouvas and A. Zafeiropoulos, "A Middleware for Mobile Edge Computing," in IEEE Cloud Computing, vol. 4, No. 4, pp. 26-37, Jul./Aug. 2017 (Year: 2017).*

"Future Directions in Cable Networks, Services and Management," in Cable Networks, Services, and Management , IEEE, 2015, pp . 246-340 (Year: 2015).*

F. Alvarez et al., "An Edge-to-Cloud Virtualized Multimedia Service Platform for 5G Networks, " in IEEE Transactions on Broadcasting, vol. 65, No. 2, pp. 369-380, Jun. 2019 (Year: 2019).*

* cited by examiner

300

CLOUD COMPUTING ENVIRONMENTS 375
VIRTUALIZED NETWORK FUNCTION CLOUD 325
VNE 330
VNE 332
VNE 334
TRANSPORT LAYER 350
BROADBAND ACCESS 110
VOICE ACCESS 130
WIRELESS ACCESS 120
MEDIA ACCESS 140
CONTENT SOURCES 175

600

APPARATUSES AND METHODS FOR FACILITATING A MULTI-ENVIRONMENT EVENT INFRASTRUCTURE MANAGER

FIELD OF THE DISCLOSURE

The subject disclosure relates to apparatuses and methods for facilitating a multi-environment event infrastructure manager (MEEIM).

BACKGROUND

As the world increasingly becomes connected via vast communication networks and systems and via various communication devices, additional opportunities are created/generated to provision communication services. Conventionally, event-driven environments and cloud configurations are not visible across a hybrid, multi-cloud set of hyperscaler, vendor-managed environments and premise environments that clients manage. Solutions or topologies that run on premises, in company-specific hyperscaler infrastructures, and as part of software as a service (SaaS) solutions that run in private or hyperscaler infrastructures, are not visible from one entity-wide control plane; instead, each is an independent data plane with an independent control plane, leaving operations teams with a need to develop in-house solutions to aggregate information from each environment to assemble views of deployed inventory, health, and performance, and to provide management oversight and controls. To the extent that hyperscalers offer event integration solutions, such solutions are native and specific to their cloud domains and are not portable across cloud providers.

BRIEF DESCRIPTION OF THE DRAWINGS

Reference will now be made to the accompanying drawings, which are not necessarily drawn to scale, and wherein.

DETAILED DESCRIPTION

Figure 1:
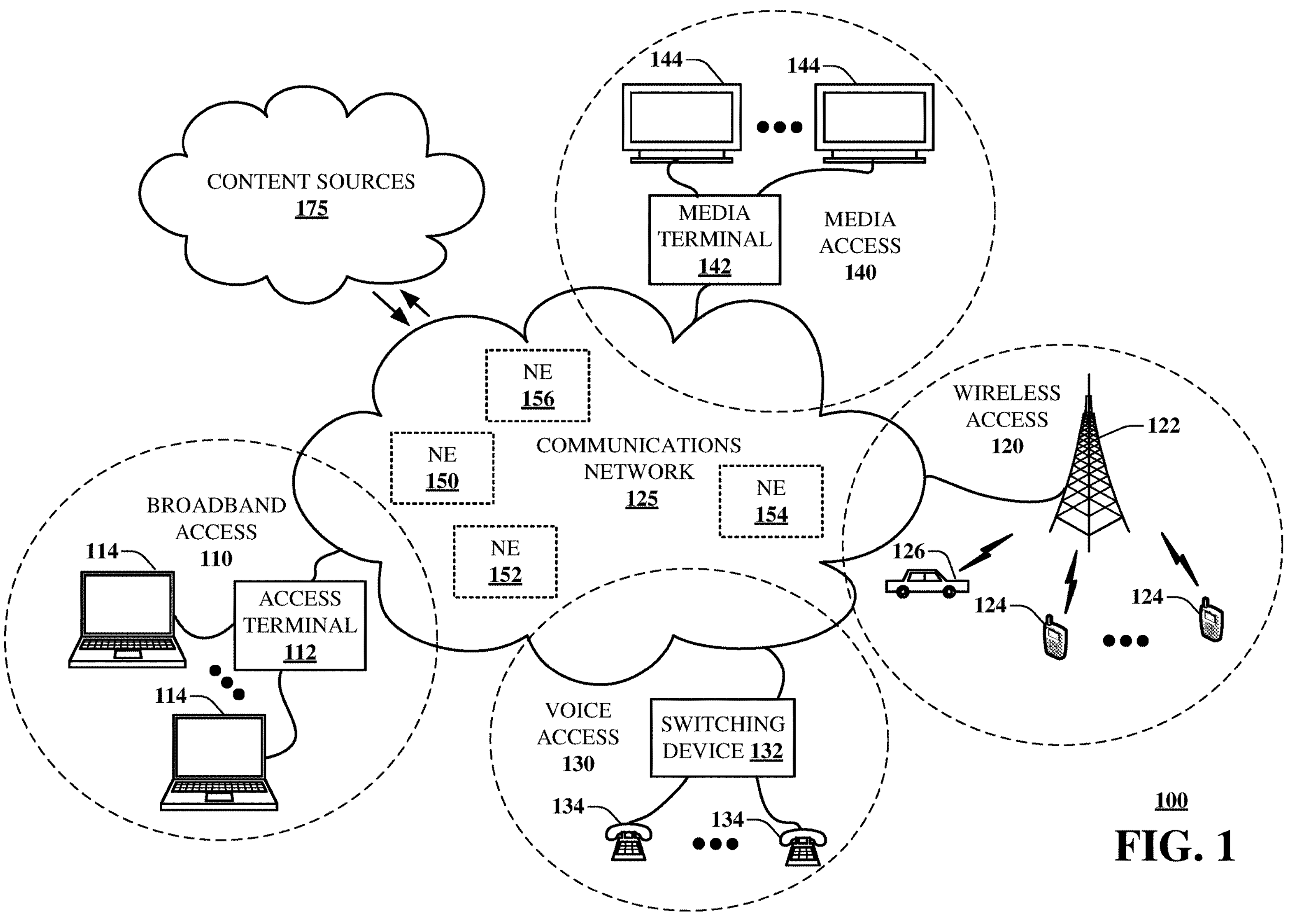
FIG. 1 is a block diagram illustrating an exemplary, non-limiting embodiment of a communications network in accordance with various aspects described herein.

The subject disclosure describes, among other things, illustrative embodiments for enhancing flexibility as part of provisioning a communication service in respect of a pool of available resources, including in relation to cloud computing resources and environments. Management, configuration, and modification based operations may be facilitated across multiple environments utilizing a common control plane framework, platform, and toolset/tool suite. Other embodiments are described in the subject disclosure.

One or more aspects of the subject disclosure include, in whole or in part, obtaining a request pertaining to an onboarding of an application supporting a communication network or system; based on the obtaining of the request, establishing a profile for the application; selecting first resources of a first cloud computing network to support the application; based on the selecting of the first resources, configuring at least one resource of the first resources based on the profile; and deploying a first instance of the application to utilize the first resources.

One or more aspects of the subject disclosure include, in whole or in part, obtaining, via a portal acting as a control plane, a first request to onboard a first application that is used to provide a first communication service; predicting, based on the obtaining of the first request, a first workload associated with an execution of an instance of the first application; selecting, based on the predicting of the first workload, a first cloud environment (e.g., a first portal-controlled data plane) for hosting the instance of the first application; obtaining, via the portal, a second request to onboard a second application that is used to provide a second communication service; predicting, based on the obtaining of the second request, a second workload associated with an execution of an instance of the second application; selecting, based on the predicting of the second workload, a second cloud environment (e.g., a second portal-controlled data plane) for hosting the instance of the second application; presenting, via a dashboard, first metrics associated with the execution of the instance of the first application in the first cloud environment; and presenting, via the dashboard, second metrics associated with the execution of the instance of the second application in the second cloud environment.

One or more aspects of the subject disclosure include, in whole or in part, projecting, by a processing system including a processor, a workload associated with an execution of an application, resulting in a projected workload; selecting, by the processing system and based on the projected workload, a first cloud environment for hosting a first instance of the application; configuring, by the processing system and based on the selecting, a first resource of the first cloud environment to adhere to a security requirement associated with the execution of the application, resulting in a first configured resource; and deploying, by the processing system, the first instance of the application on the first cloud environment, the deploying including a utilization of the first configured resource.

Referring now to FIG. 1, a block diagram is shown illustrating an example, non-limiting embodiment of a system 100 in accordance with various aspects described herein. For example, the system 100 can facilitate, in whole or in part, obtaining a request pertaining to an onboarding of an application supporting a communication network or system, based on the obtaining of the request, establishing a profile for the application, selecting first resources of a first cloud computing network to support the application, based on the selecting of the first resources, configuring at least one resource of the first resources based on the profile, and deploying a first instance of the application to utilize the first resources. The system 100 can facilitate, in whole or in part, obtaining, via a portal, a first request to onboard a first application that is used to provide a first communication service, predicting, based on the obtaining of the first request, a first workload associated with an execution of an instance of the first application, selecting, based on the predicting of the first workload, a first cloud environment for hosting the instance of the first application, obtaining, via the portal, a second request to onboard a second application that is used to provide a second communication service, predicting, based on the obtaining of the second request, a second workload associated with an execution of an instance of the second application, selecting, based on the predicting of the second workload, a second cloud environment for hosting the instance of the second application, presenting, via a dashboard, first metrics associated with the execution of the instance of the first application in the first cloud environment, and presenting, via the dashboard, second metrics associated with the execution of the instance of the second application in the second cloud environment. The system 100 can facilitate, in whole or in part, projecting, by a processing system including a processor, a workload associated with an execution of an application, resulting in a projected workload, selecting, by the processing system and based on the projected workload, a first cloud environment for hosting a first instance of the application, configuring, by the processing system and based on the selecting, a first resource of the first cloud environment to adhere to a security requirement associated with the execution of the application, resulting in a first configured resource, and deploying, by the processing system, the first instance of the application on the first cloud environment, the deploying including a utilization of the first configured resource.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

By way of introduction, a hybrid, multi-cloud capable control plane is described herein that enables network and system operators and service providers to deploy event-driven solutions into any environment and manage the environment from a single perspective. Using this perspective, operators/service providers can enhance (e.g., optimize) performance and reduce (e.g., minimize) costs by leveraging a control plane and inventory for managing event-driven integration platform and solution deployments. Aspects of this disclosure provide for a hybrid, multi-cloud and premise event integration deployment and management across multiple premises and cloud hypervisor environments. Once an entity (e.g., a corporation) has deployed a multi-environment event infrastructure manager (MEEIM) and related infrastructure, other applications of the entity might no longer need to develop (or have developed on their behalf) their own event-driven infrastructure and integrate with one another and each hyperscaler. Instead, solutions that run on the MEEIM may simply be onboarded, developed, and managed, and controls may be exerted or exercised for the relevant resources that are consumed. This may result in, e.g., a 50-70% reduction in development time and costs for each application, thereby enhancing the efficiency of the overall operations.

In some embodiments, metadata-driven event integration components may be provided for hybrid, multi-premise, and multi-cloud operations. Illustratively, the components may be referred to herein as: Event Portal, Master Schema Registry, Multi-Cloud/Multi-Environment Deployment, Application Onboarding, Activities Profile, (Capabilities) Volumes Projections, Cost Estimation, (Performance) Metrics Integration, Logging Integration, Security Controls, and Dashboards. The components, which may be integrated or combined as part of one or more platforms, topologies, or the like, may be used to support entity (e.g., enterprise) specific definitions and procedures based on standards and/or policies. Various functions for each of the aforementioned components are described below. One skilled in the art will appreciate that a given function may be resident on/in one or more of the aforementioned components, which is to say that the function may be partially or even wholly reallocated to another component without any loss in accuracy of description. Furthermore, in some embodiments one or more of the functions may be optional, and additional functions that are not described may be included. In this respect, the functions described below in respect of the aforementioned components are illustrative.

The Event Portal may facilitate an onboarding of new applications. The Event Portal may act as a central control plane that may be used to select data planes (e.g., premise and/or hyperscaler infrastructures) to deploy into. The Event Portal may provide or include a user interface (e.g., a graphical user interface [GUI] and/or command line interface [CLI] integration) that may be used by administrators and application teams to develop and deploy solutions, monitor and manage those solutions, and visualize resource utilization and costs across their view of premise and hyperscaler environment resources. In some embodiments, the Event Portal may facilitate integration across multiple hyperscaler infrastructures (e.g., across multiple data planes) to enable hybrid, multi-cloud deployment, monitoring, management, and cost estimation.

The Application Onboarding may facilitate application onboarding via the Event Portal by facilitating inputs from an application administrator that may be used to establish an application profile. The application profile may include contacts, hyperscaler subscriptions, resources, metadata, and associated planning and inventory used to govern deployment, administration and management of environments, solutions, and metadata. Onboarding via a central control plane of the Event Portal may enable a consolidation of inventory, policies and controls that may provide for a comprehensive set or suite of solutions.

The (Capabilities) Volume Projections may be used in onboarding and operational planning to forecast throughput volumes by workload types (i.e., event integration, change data capture, connector solutions, event stream solutions, etc.). The forecast may enable automated deployment, scaling, and management of resources across deployed environments. As a result, an ability to enhance (e.g., optimize) how resources are used and managed across multi-premise and multi-cloud environments may be obtained, potentially in respect of an entity (e.g., an enterprise) and any affiliates or partners thereof.

The Master Schema Registry may correspond to, or include, a centrally managed repository of event schemas and metadata that may be used to manage and synchronize metadata across a federated set of schema registries within each hyperscaler and premise environment where onboarded clients may deploy and run solutions. The registry may support multiple schema representations (e.g., JSON, Avro, Protobuf, etc.) that define the structure, format and content of messages. A capability may be provided to integrate with each hyperscaler and synchronize content to enable consistent schema validation activities across environments. The Master Schema Registry may extend to, and federate across, all relevant registry instances to ensure vendor-neutral, common schema definitions or definitional constructs used across hybrid premise and cloud environments to perform real-time schema consistency checks using the most current schema versions. Presentations of various types or kinds of data (e.g., metrics) may adhere to the common definitional constructs, which may be useful from a perspective of a user or operator in that the user/operator might not be forced to undertake translation-based activities in interpreting outputs or results or comparing outputs or results.

The Activities Profile may capture event publisher, event consumer, solution developer, and platform administrator activities and workload types to enable an overall view of activities per event topic. This resource usage view based on application activity by workload type facilitates the allocation of costs for dedicated or shared assets. Using this activity report, operational tooling can be automated to manage scale, recovery, deployment and cost reporting functions. By virtue of the understanding or comprehension gained of activities across all deployed environments, this may allow for better optimization of resources and enable cost reductions and the dynamic ability to redeploy and scale solutions to any in-scope environment.

The Multi-Cloud/Multi-Environment Deployment may facilitate establishing an environment within one or more hyperscaler infrastructures and deploying application solutions onto/into each environment using central control plane inventories. Templates may be utilized that are compatible with, and configured to/for, each premise and hyperscaler environment, facilitating a use of inputs from the Application Onboarding to establish the environment, deploy solutions, and trigger schema registry synchronization. Each environment may be deployed using a subscription (e.g., a corporate or enterprise subscription) and associated application subscriptions for each deployment.

The Cost Estimation may use pre-defined rate cards and volume projections to produce cost reports. These cost reports may be used as part of a selection of data planes (e.g., optimal data planes) offered across premise and cloud provider infrastructures. These reports may also facilitate usage-based reporting for cost management functions.

The (Performance) Metrics Integration may provide an overall view of the metrics that may be necessary for an event-driven system topology. In some embodiments, metrics (e.g., Kafka based JMX metrics) may be used related to cluster, topic, event producer, and/or consumer performance data to provide a holistic view for performance management. Integration may occur, or be provided for, once within each premise or hyperscaler environment that an entity intends to operate within. Applications may then be deployed to any of these environments and managed using metrics (e.g., standard or standardized metrics) that may be aggregated for central oversight in hybrid, multiple-premise and cloud environments.

The Logging Integration may collect auditing and operations support event log data from each environment and consolidate the data into a centralized storage system for integration with standard logging tools. Logging standards or policies may be used to ensure complete and consistent analysis of logs and to enable policy-based security scans and audits. The Logging Integration may be designed and implemented to enable an integration of event logging data from a hybrid premise and multi-cloud ecosystem where logs may be aggregated to provide for a holistic view/perspective.

The Security Controls may enable policy-based exposure of event logs from a distributed set of environments to facilitate policy-based scanning for security, privacy and other compliance-based processing. This collection and scanning approach may be used to ensure that publishers comply with privacy, retention and encryption standards or policies when publishing event content into topics across one or more (e.g., all) data planes. Applications that do not comply may be revoked and suspended until conditions are satisfied, such as an occurrence of remediation/remedial measures.

The Dashboards may provide an interface (e.g., a user interface) and API to present (e.g., visualize) and expose performance and availability data to event publishers, consumers, subscription owners, and administrative users. End-to-end operational views, metrics-based data, logging data, activity data, performance data, and compliance data may be collected and managed across premise and cloud provider environments, and the same may be presented via the Dashboards in one or more formats (e.g., one or more messages, reports, etc.).

Figure 2A:
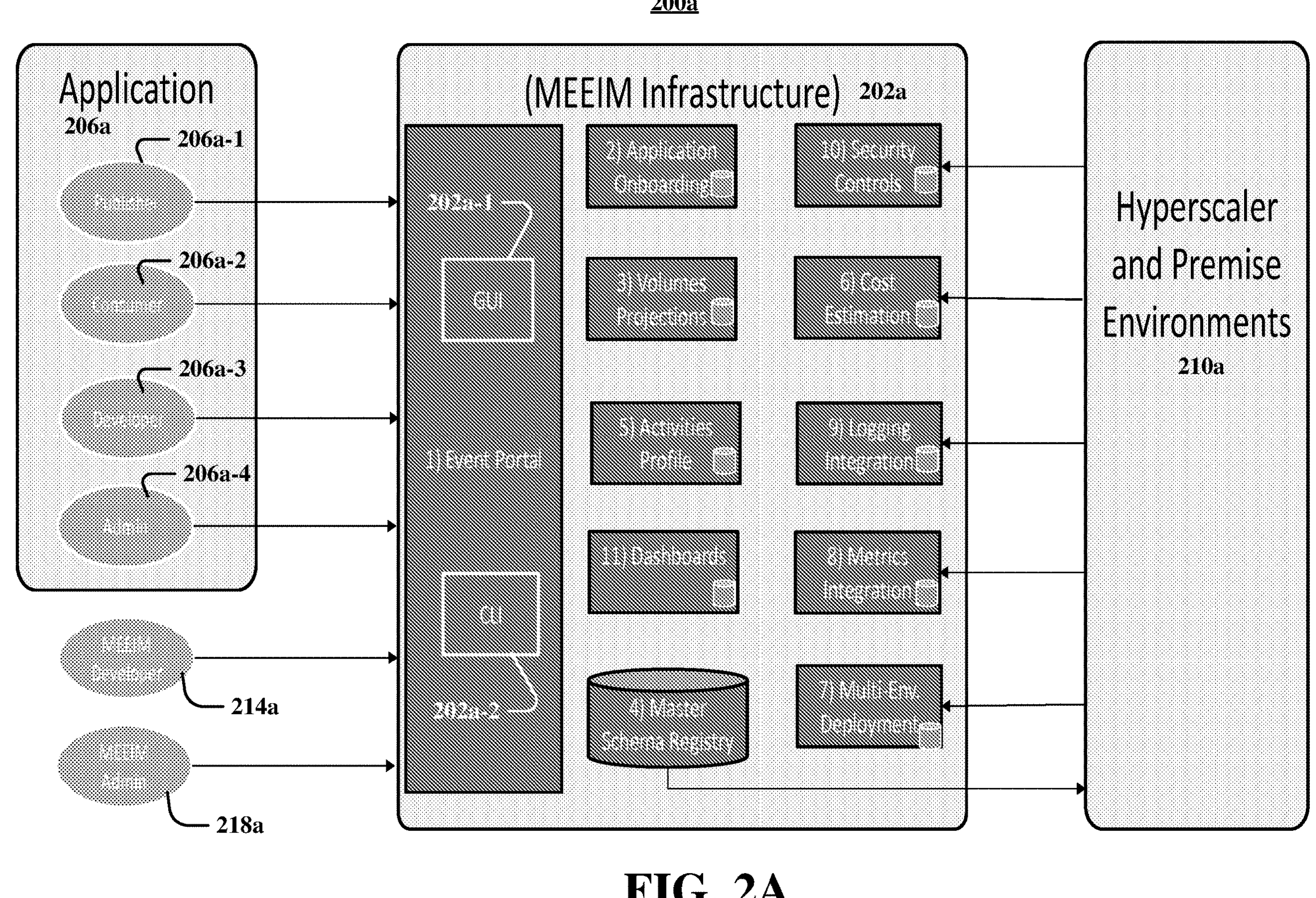
FIG. 2A is a block diagram illustrating an example, non-limiting embodiment of a system in accordance with various aspects described herein.

With the foregoing in mind, reference may now be made to FIG. 2A, which depicts a block diagram illustrating an example, non-limiting embodiment of a system 200*a* in accordance with various aspects described herein. In some embodiments, one or more parts/portions of the system 200*a* may function within, or may be operatively overlaid upon, one or more parts/portions of the system 100 of FIG. 1.

The system 200*a* may include multi-environment event infrastructure manager (MEEIM) infrastructure 202*a*, an application 206*a*, and hyperscaler and premise environments 210*a*. Also, the system 200*a* may include a MEEIM developer 214*a* and a MEEIM administrator (admin) 218*a*.

The MEEIM infrastructure 202*a* may include one or more of the aforementioned components, such as for example: 1) Event Portal, 2) Application Onboarding, 3) Volumes Projections, 4) Master Schema Registry, 5) Activities Profile, 6) Cost Estimation, 7) Multi-Environment (Multi-Env.) Deployment, 8) Metrics Integration, 9) Logging Integration, 10) Security Controls, and/or 11) Dashboards. The components of the MEEIM infrastructure 202*a* may provide/facilitate one or more of the functionalities/functions set forth above.

The application 206*a* may include a publisher 206*a*-1, a consumer 206*a*-2, a developer 206*a*-3 and an admin 206*a*-4. The publisher 206*a*-1 may publish events and manage requests as directed to the infrastructure 202*a*. The consumer 206*a*-2 may consume events and manage streams, as directed to the infrastructure 202*a*. The developer 206*a*-3 may develop, configure, deploy and manage one or more aspects of the application 206*a*, and provide indications of the same to the infrastructure 202*a*. The admin 206*a*-4 may onboard, configure, deploy, and manage one or more aspects of the application 206*a*, and provide indications of the same to the infrastructure 202*a*.

The hyperscaler and premise environments 210*a* may provide (e.g., expose) scans and/or compliance data/information that may be provided to the infrastructure 202*a* (e.g., the 10) Security Controls). The hyperscaler and premise environments 210*a* may generate or obtain billing and broker usage data/information that may be provided (e.g., exposed) to the infrastructure 202*a* (e.g., the 6) Cost Estimation). The hyperscaler and premise environments 210*a* may generate or obtain log extracts and administration data/information that may be provided (e.g., exposed) to the infrastructure 202*a* (e.g., the 9) Logging Integration). The hyperscaler and premise environments 210*a* may generate or obtain metrics/metrics extracts/extractions and/or administration data/information that may be provided (e.g., exposed) to the infrastructure 202*a* (e.g., the 8) Metrics Integration). The hyperscaler and premise environments 210*a* may generate or obtain deployment and/or administration data/information that may be provided (e.g., exposed) to the infrastructure 202*a* (e.g., the 7) Multi-Env. Deployment). The 4) Master Schema Registry of the infrastructure 202*a* may provide metadata synchronization information to the hyperscaler and premise environments 210*a*.

The MEEIM developer 214*a* and/or the MEEIM admin 218*a* may provide data or information pertaining to development, onboarding, configuration, deployment and management based activities. In some embodiments, the developer 214*a* and/or the admin 218*a* may provide/supply a user input that may result in a modification of a parameter of an application. The modification may be captured as an instance of the application and may be saved/stored in conjunction with one or more registries.

In terms of operation, the infrastructure 202*a* (e.g., the 1) Event Portal) may be involved in applications being onboarded via a user interface, such as a GUI 202*a*-1 or a command line interface (CLI) 202*a*-2. To facilitate such onboarding, solution requirements may be defined, including identifications or determinations of cloud provider regions, topics, events, producers, consumers, peak and average throughput volumes, retention, and latency over time and for each type of workload.

During onboarding, profiles may be established (in, e.g., the 2) Application Onboarding of the infrastructure 202*a*) for facilitating control plane integration and solution management. Contacts and notification preferences may define the scope of user and component roles. Cloud subscriptions and financial projects may map environment and resource ownership to applications and users as part of the 3) Volume Projections. Security and compliance profile(s) may be generated/established for role-based authentication and authorized as part of the 10) Security Controls. Resource usage and cost estimation information may provide a history of resource use and projections over time to be able to estimate costs involved; the same may be included as part of the 5) Activities Profile. The 11) Dashboards may provide application users and components with historical and projected activity and performance data.

The 4) Master Schema Registry may provide access to inventory version generation and control information. Versions may be created for each metadata definition of a topic, event, change data capture, stream process, or event-driven flow segment.

The infrastructure 202*a* may provide support for the development and management of solution components, where needed, to satisfy application workloads. This may include integration with cloud provider infrastructures to satisfy unique solution requirements and event stream solutions including new stream processor and development templates. In this respect, the 10) Security Controls may provide security integration features to ensure that each component or application instance has appropriate privileges and credentials assigned/allocated across active environments. The 8) Metrics Integration and the 9) Logging Integrity may, individually or collectively, log and integrate metrics and collect aggregate views of activities, errors, and performance to facilitate global operational and administrative views. The hyperscaler and premise environments 210*a* may provide new change data connectors/connections for new database types and versions, new solution or application instances, and configuration changes. The 7) Multi-Env.

Deployment may provide tooling, including new templates and toolchains to enable automated deployments across multiple environments. In conjunction with the same, the 7) Multi-Env. Deployment may deploy and configure/scale infrastructure resources to enable applications to deploy solutions into premise and cloud environments.

The infrastructure 202*a* (e.g., the 1) Event Portal) may support an application developer to configure and manage solution components to produce/consume data or resources, manage streams, etc., from a central control plane to facilitate multi-environment uses. The 2) Application Onboarding may work in conjunction with the hyperscale and premise environments 210*a* to support a solution inventory and runtime registry entries for each instance of application solutions that fulfill requirements/specifications. Furthermore, testing and monitoring may be provided to ensure compliance with such requirements/specifications up to, and even after, deployment.

Figure 2B:
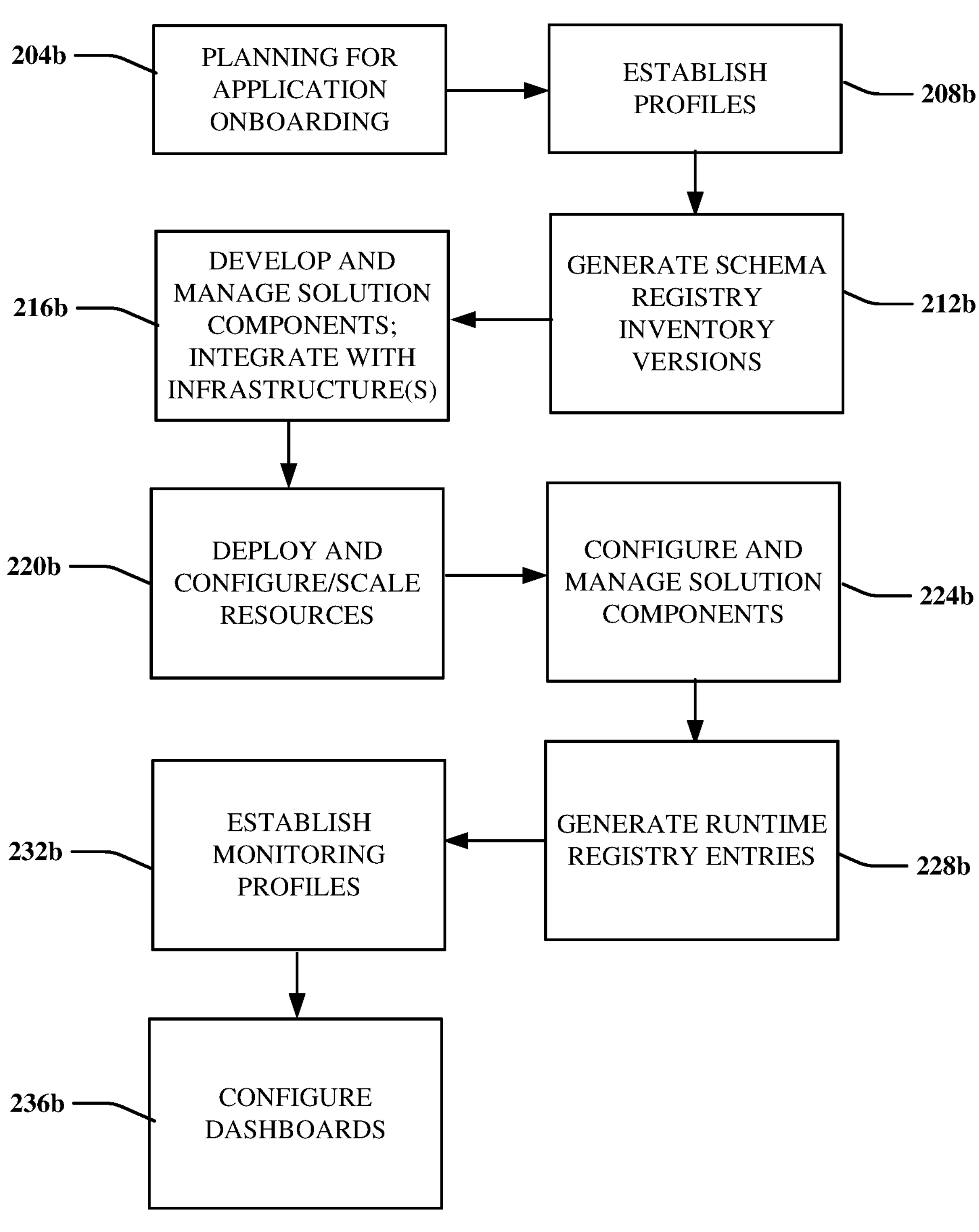
FIG. 2B depicts an illustrative embodiment of a method in accordance with various aspects described herein.

Referring to FIG. 2B, a flowchart of an illustrative embodiment of a method 200*b* in accordance with various aspects described herein is shown. The method 200*b* may be implemented (e.g., executed), in whole or in part, in conjunction with one or more systems, networks, devices, or components, such as for example the systems, networks, devices, and components described herein. The method 200*b* may be implemented to realize functionality associated with one or more algorithms or techniques for configuring, maintaining, monitoring, or modifying a communication network or system. More generally, the method 200*b* may be utilized to realize a solution to an optimization problem in respect of cloud computing resources vis-à-vis one or more applications. The method 200*b* is described below in relation to the blocks shown in FIG. 2B. The blocks may be associated with operations that may be implemented via one or more instructions (e.g., executable instructions). The instructions may be executed by a processing system that may include one or more processors.

In block 204*b*, planning may be undertaken/performed in respect of application onboarding. For example, the planning may include defining solution requirements in respect of cloud provider regions, topics, events, producers, consumers, parameters (e.g., throughput volumes), retention, latency, etc. The planning may be specified for a given time period and across/in respect of one or more workloads, tasks, or the like. A submission of an application (or an instance thereof) may be based on a request to onboard the application (or respective instance).

In block 208*b*, one or more profiles may be established. The profiles may facilitate control plane integration and solution management activities. Application contacts and notification preference profiles may be used to define the scope of user and component roles. Cloud subscription and financial project profiles may map environment and resource ownership considerations to applications, users, and resources. Security and compliance profiles may establish role-based authentication and authorization responsibilities or permissions. Resource usage and cost estimation profiles may provide a history of resource use and projection over time and estimate costs. Dashboard profiles may provide application users and components with historical and projected activity and performance data.

In block 212*b*, schema registry inventory versions may be generated. The versions may be created for definitions of topics, events, change data capture, streams, processes/procedures, event-driven flow segments, or the like. In some embodiments, metadata may be used as part of the definitions.

In block 216*b*, solution components may be developed and managed, and integrated with infrastructure(s) (or resources thereof). By way of example, and without limitation, the solution components of block 216*b* may include or pertain to: security integration, logging and metrics, change data connectors/connections, deployment tooling, etc.

In block 220*b*, resources may be deployed and configured/scaled to enable applications to deploy and manage solutions into premise and cloud environments.

In block 224*b*, solution components may be configured and managed. For example, the configuration and management of block 224*b* may facilitate production or consumption of data or information, management of streams, etc. The configuration and management of block 224*b* may be based on one or more requirements or specifications.

In block 228*b*, one or more runtime registry entries may be generated. A respective entry may be generated for each instance of an application.

In block 232*b*, one or more monitoring profiles may be established or generated. The monitoring profiles may include a specification of whether and when to perform a test, under what conditions to perform a test, sample/sampling rates to use for testing or monitoring purposes, etc. The profiles may be based on the registry entries of block 228*b* (e.g., to track each instance of an application).

In block 236*b*, one or more dashboards may be configured or established. For example, a dashboard may be used to render (e.g., visualize) an application configuration, along with any solution component instances that may be included. Indications of performance, health, or other statuses (as potentially determining via monitoring activities associated with block 232*b*) may be provided via the dashboard.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may enable and amplify the value of network operators (e.g., mobile virtual network operators [MVNOs]) and application programming interface (API) investments/monetization activities. Practical applications of the various aspects of this disclosure enable and provide an innovative way to visualize and manage aggregate views of operational and performance data for hybrid multi-premise and multi-cloud management and administration with incentive-based application mechanisms. Embodiments of this disclosure may be utilized to enhance or realize productivity gains across an entire entity (e.g., an entire enterprise), as well as for each individual application owner or user. Aspects of this disclosure may facilitate an efficient and enhanced (e.g., optimized) use of resources across environments managed by an entity (e.g., an enterprise) and affiliates or partners thereof. Aspects of this disclosure may enable new ways/techniques of facilitating deployment, automation, and integration of assets or resources, along with support for planning and monitoring to reduce waste/cost. Adaptations may be supported to enable migrations to occur from a first version of an application, platform, environment, or service to a second version of the application, platform, environment, or service. For example, based on changes in terms or conditions (e.g., cost or price), a network/system operator or service provider may migrate from a first cloud environment/provider to a second cloud environment/provider. The migration may occur with little to no incremental effort on the part of the network/system operator or service provider. For example, a first instance of an application that is utilized in conjunction with a first environment may be redeployed as another instance (or a variant thereof) of the application as part of one or more other environments; the first instance may be discarded/removed/revoked to reduce cost. Embodiments of this disclosure may provide for various views of, or insights into, relationships between an entity (e.g., an enterprise) and its partners or affiliates, thereby enabling efficient operations in terms of management and organization. Moreover, aspects of this disclosure may be used to uncover/discover potential new relationships that might otherwise have gone unnoticed or unaccounted for, thereby potentially enhancing/increasing the scope and reach of an entity in a given marketplace. Aspects of this disclosure may help to reshape and transform a silo/isolated entity structure/culture by enhancing event-driven architectures and choreography-based solutions management activities amongst various disciplines (e.g., sales, billing, ordering, engineering, etc.) of an entity or organization, which may accelerate/amplify entity-based initiatives and monetization strategies across various domains or marketplaces to increase return on investment. Aspects of this disclosure may be used to enrich and enhance an accuracy of messages, reports, communications or the like, bringing about an enhancement in efficiency of operations. In brief, and as demonstrated herein, the various aspects of this disclosure are integrated as part of numerous practical applications that yield substantial improvements to technology. In this respect, and as one skilled in the art will appreciate, the various aspects of this disclosure are not directed to abstract ideas. To the contrary, the various aspects of this disclosure are directed to, and encompass, significantly more than any abstract idea standing alone.

Figure 3:
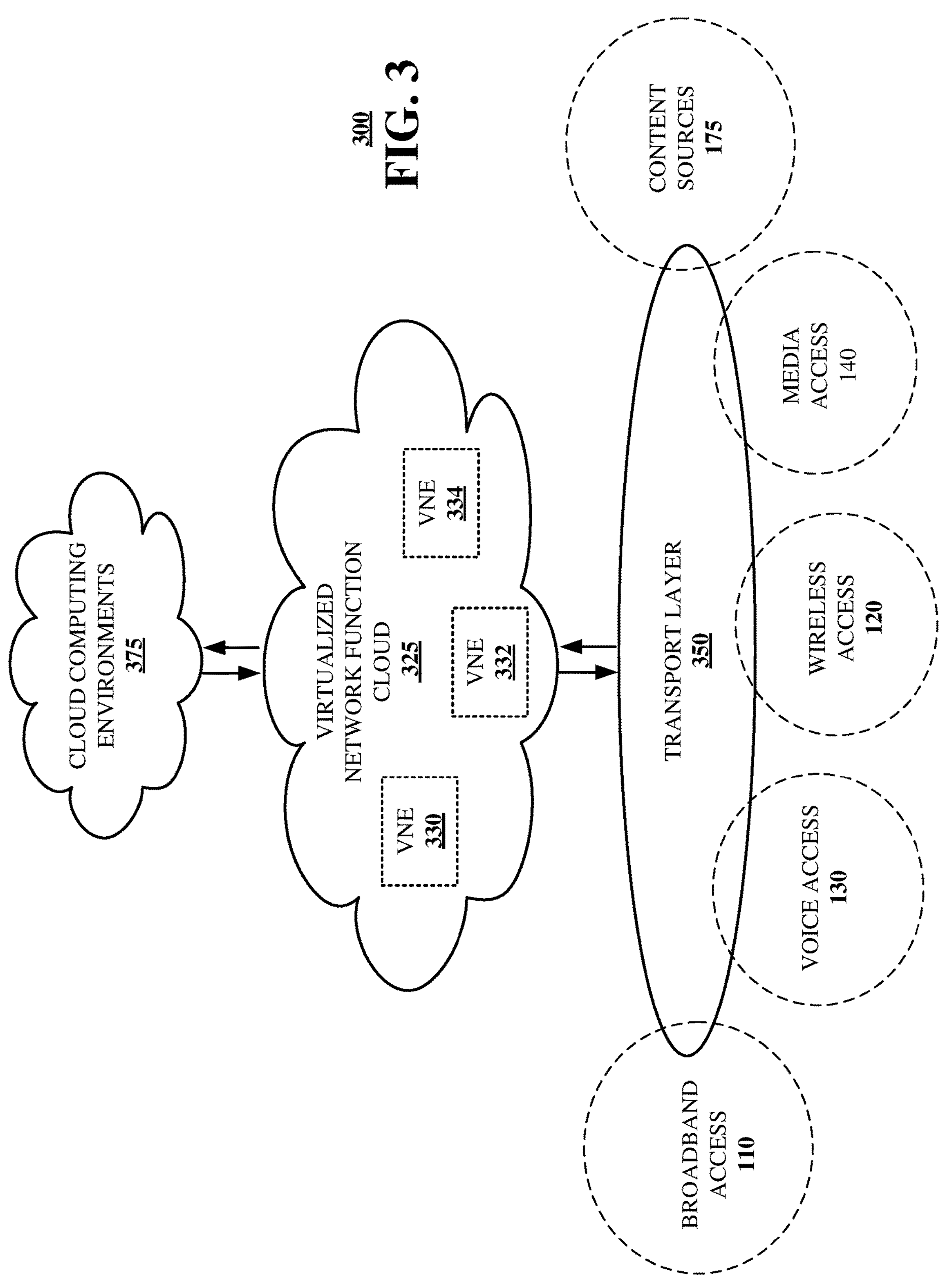
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200*a*, and method 200*b* presented in FIGS. 1, 2A, and 2B. For example, the virtualized communication network 300 can facilitate, in whole or in part, obtaining a request pertaining to an onboarding of an application supporting a communication network or system, based on the obtaining of the request, establishing a profile for the application, selecting first resources of a first cloud computing network to support the application, based on the selecting of the first resources, configuring at least one resource of the first resources based on the profile, and deploying a first instance of the application to utilize the first resources. The virtualized communication network 300 can facilitate, in whole or in part, obtaining, via a portal, a first request to onboard a first application that is used to provide a first communication service, predicting, based on the obtaining of the first request, a first workload associated with an execution of an instance of the first application, selecting, based on the predicting of the first workload, a first cloud environment for hosting the instance of the first application, obtaining, via the portal, a second request to onboard a second application that is used to provide a second communication service, predicting, based on the obtaining of the second request, a second workload associated with an execution of an instance of the second application, selecting, based on the predicting of the second workload, a second cloud environment for hosting the instance of the second application, presenting, via a dashboard, first metrics associated with the execution of the instance of the first application in the first cloud environment, and presenting, via the dashboard, second metrics associated with the execution of the instance of the second application in the second cloud environment. The virtualized communication network 300 can facilitate, in whole or in part, projecting, by a processing system including a processor, a workload associated with an execution of an application, resulting in a projected workload, selecting, by the processing system and based on the projected workload, a first cloud environment for hosting a first instance of the application, configuring, by the processing system and based on the selecting, a first resource of the first cloud environment to adhere to a security requirement associated with the execution of the application, resulting in a first configured resource, and deploying, by the processing system, the first instance of the application on the first cloud environment, the deploying including a utilization of the first configured resource.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
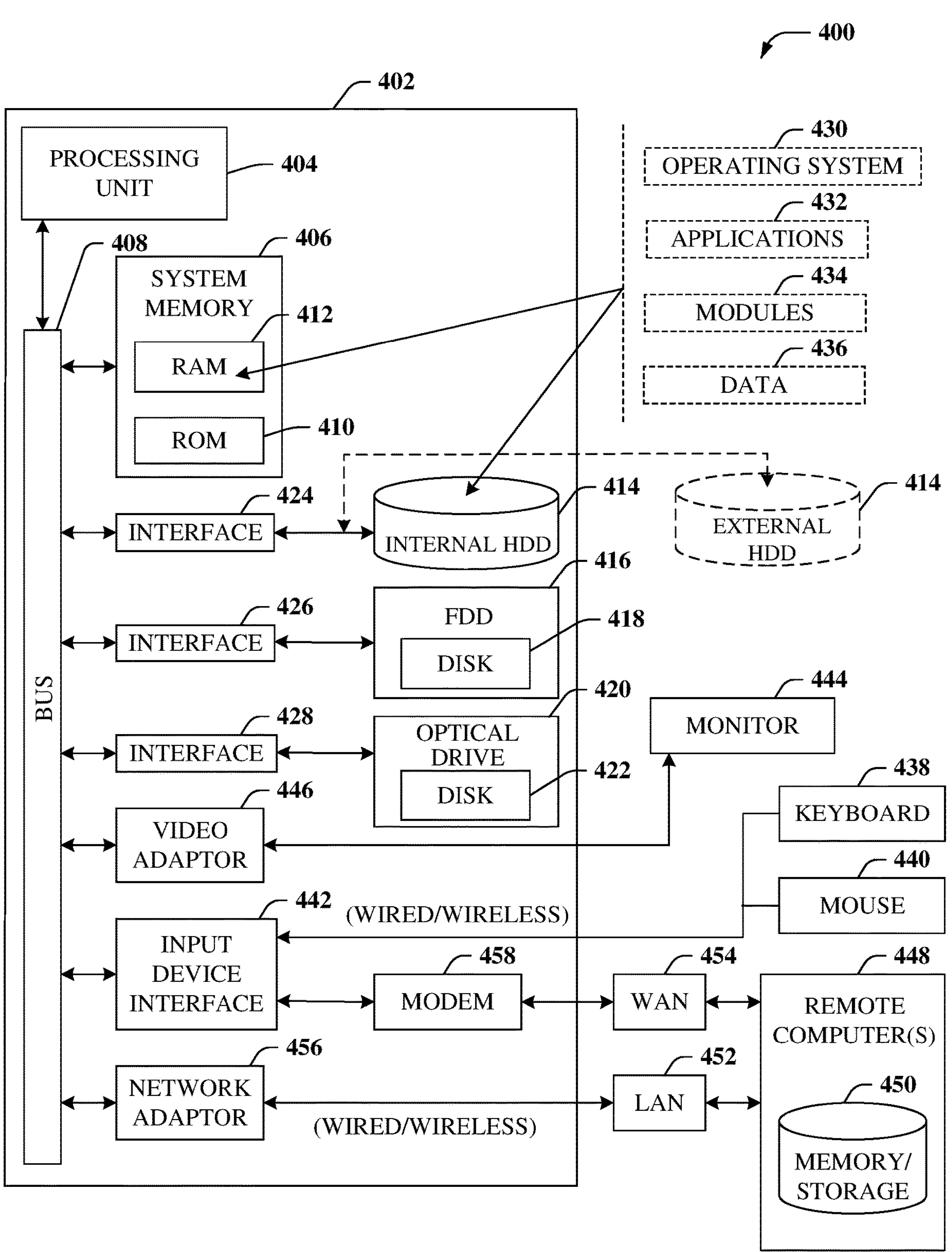
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate, in whole or in part, obtaining a request pertaining to an onboarding of an application supporting a communication network or system, based on the obtaining of the request, establishing a profile for the application, selecting first resources of a first cloud computing network to support the application, based on the selecting of the first resources, configuring at least one resource of the first resources based on the profile, and deploying a first instance of the application to utilize the first resources. The computing environment 400 can facilitate, in whole or in part, obtaining, via a portal, a first request to onboard a first application that is used to provide a first communication service, predicting, based on the obtaining of the first request, a first workload associated with an execution of an instance of the first application, selecting, based on the predicting of the first workload, a first cloud environment for hosting the instance of the first application, obtaining, via the portal, a second request to onboard a second application that is used to provide a second communication service, predicting, based on the obtaining of the second request, a second workload associated with an execution of an instance of the second application, selecting, based on the predicting of the second workload, a second cloud environment for hosting the instance of the second application, presenting, via a dashboard, first metrics associated with the execution of the instance of the first application in the first cloud environment, and presenting, via the dashboard, second metrics associated with the execution of the instance of the second application in the second cloud environment. The computing environment 400 can facilitate, in whole or in part, projecting, by a processing system including a processor, a workload associated with an execution of an application, resulting in a projected workload, selecting, by the processing system and based on the projected workload, a first cloud environment for hosting a first instance of the application, configuring, by the processing system and based on the selecting, a first resource of the first cloud environment to adhere to a security requirement associated with the execution of the application, resulting in a first configured resource, and deploying, by the processing system, the first instance of the application on the first cloud environment, the deploying including a utilization of the first configured resource.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
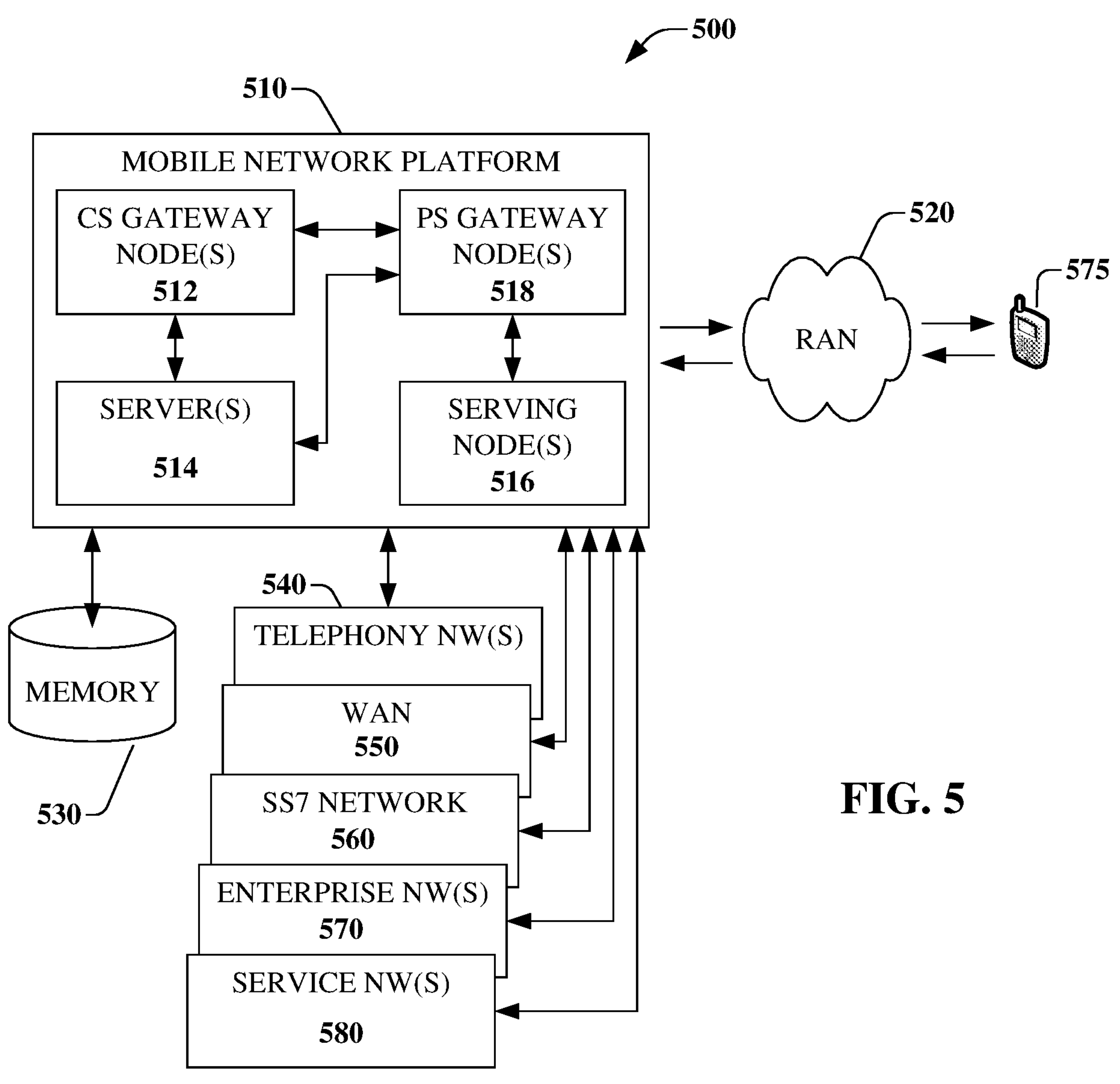
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 can facilitate, in whole or in part, obtaining a request pertaining to an onboarding of an application supporting a communication network or system, based on the obtaining of the request, establishing a profile for the application, selecting first resources of a first cloud computing network to support the application, based on the selecting of the first resources, configuring at least one resource of the first resources based on the profile, and deploying a first instance of the application to utilize the first resources. The platform 510 can facilitate, in whole or in part, obtaining, via a portal, a first request to onboard a first application that is used to provide a first communication service, predicting, based on the obtaining of the first request, a first workload associated with an execution of an instance of the first application, selecting, based on the predicting of the first workload, a first cloud environment for hosting the instance of the first application, obtaining, via the portal, a second request to onboard a second application that is used to provide a second communication service, predicting, based on the obtaining of the second request, a second workload associated with an execution of an instance of the second application, selecting, based on the predicting of the second workload, a second cloud environment for hosting the instance of the second application, presenting, via a dashboard, first metrics associated with the execution of the instance of the first application in the first cloud environment, and presenting, via the dashboard, second metrics associated with the execution of the instance of the second application in the second cloud environment. The platform 510 can facilitate, in whole or in part, projecting, by a processing system including a processor, a workload associated with an execution of an application, resulting in a projected workload, selecting, by the processing system and based on the projected workload, a first cloud environment for hosting a first instance of the application, configuring, by the processing system and based on the selecting, a first resource of the first cloud environment to adhere to a security requirement associated with the execution of the application, resulting in a first configured resource, and deploying, by the processing system, the first instance of the application on the first cloud environment, the deploying including a utilization of the first configured resource.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
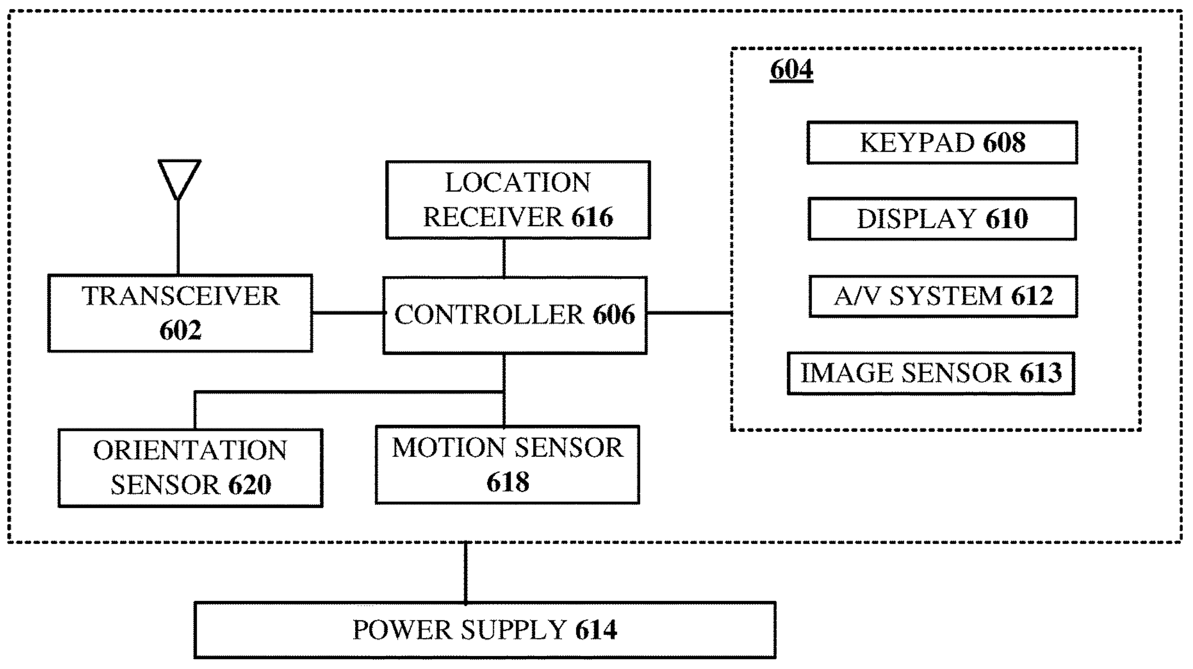
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 can facilitate, in whole or in part, obtaining a request pertaining to an onboarding of an application supporting a communication network or system, based on the obtaining of the request, establishing a profile for the application, selecting first resources of a first cloud computing network to support the application, based on the selecting of the first resources, configuring at least one resource of the first resources based on the profile, and deploying a first instance of the application to utilize the first resources. The computing device 600 can facilitate, in whole or in part, obtaining, via a portal, a first request to onboard a first application that is used to provide a first communication service, predicting, based on the obtaining of the first request, a first workload associated with an execution of an instance of the first application, selecting, based on the predicting of the first workload, a first cloud environment for hosting the instance of the first application, obtaining, via the portal, a second request to onboard a second application that is used to provide a second communication service, predicting, based on the obtaining of the second request, a second workload associated with an execution of an instance of the second application, selecting, based on the predicting of the second workload, a second cloud environment for hosting the instance of the second application, presenting, via a dashboard, first metrics associated with the execution of the instance of the first application in the first cloud environment, and presenting, via the dashboard, second metrics associated with the execution of the instance of the second application in the second cloud environment. The computing device 600 can facilitate, in whole or in part, projecting, by a processing system including a processor, a workload associated with an execution of an application, resulting in a projected workload, selecting, by the processing system and based on the projected workload, a first cloud environment for hosting a first instance of the application, configuring, by the processing system and based on the selecting, a first resource of the first cloud environment to adhere to a security requirement associated with the execution of the application, resulting in a first configured resource, and deploying, by the processing system, the first instance of the application on the first cloud environment, the deploying including a utilization of the first configured resource.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

obtaining a request pertaining to an onboarding of an application supporting a communication network or system;

based on the obtaining of the request, establishing a plurality of profiles for the application, wherein the plurality of profiles includes a first profile that defines a scope of user and component roles, a second profile that maps environment and resource ownership considerations to applications, users, and resources, and a third profile that provides a history of resource use and projection over time and estimated costs;

selecting first resources of a first cloud computing network and second resources of a premise environment to support the application;

based on the selecting of the first resources and the second resources, configuring at least one resource of the first resources and at least one resource of the second resources based on the plurality of profiles; and deploying, via a control plane that is common to the first cloud computing network and the premise environment, a first instance of the application to utilize the first resources and the second resources.

2. The device of claim 1, wherein the operations further comprise:

subsequent to the deploying, monitoring a performance of an execution of the first instance of the application; and providing an indication of a performance, a health, or a combination thereof, of the communication network or system based on the monitoring.

3. The device of claim 1, wherein the operations further comprise:

selecting third resources of a second cloud computing network to support the application, the second cloud computing network being different from the first cloud computing network;

based on the selecting of the third resources, configuring at least one resource of the third resources based on the plurality of profiles; and deploying a second instance of the application to utilize the third resources.

4. The device of claim 3, wherein the operations further comprise:

generating a first entry in a registry, the first entry corresponding to the first instance of the application; and generating a second entry in the registry, the second entry corresponding to the second instance of the application.

5. The device of claim 4, wherein the first instance of the application is associated with a first set of definitions based on a use of the first resources, wherein the second instance of the application is associated with a second set of definitions based on a use of the third resources, and wherein a common set of definitions is used in conjunction with the registry in association with the first instance of the application and the second instance of the application.

6. The device of claim 1, wherein the plurality of profiles includes a security and compliance profile that establishes role-based authentication and privileges.

7. The device of claim 1, wherein the plurality of profiles includes historical performance data and projected activity data.

8. The device of claim 1, wherein the obtaining of the request is based on a use of a graphical user interface, a command line interface, or a combination thereof.

9. The device of claim 1, wherein the operations further comprise:

generating a prediction of a workload associated with an execution of the application, wherein the selecting of the first resources of the first cloud computing network to support the application is based on the prediction of the workload.

10. The device of claim 9, wherein the operations further comprise:

generating an estimate of a cost associated with the workload, wherein the selecting of the first resources of the first cloud computing network to support the application is based on the estimate of the cost.

11. A non-transitory machine-readable medium, comprising executable instructions that, when executed by a processing system including a processor, facilitate performance of operations, the operations comprising:

obtaining a request pertaining to an onboarding of an application;

based on the obtaining of the request, establishing a plurality of profiles for the application, wherein the plurality of profiles includes a first profile that defines a scope of user and component roles, a second profile that maps environment and resource ownership considerations to applications, users, and resources, and a third profile that provides a history of resource use and projection over time and estimated costs;

selecting first resources of a first cloud computing network and second resources of a premise environment to support the application;

based on the selecting of the first resources and the second resources, configuring at least one resource of the first resources and at least one resource of the second resources based on the plurality of profiles; and deploying, via a control plane that is common to the first cloud computing network and the premise environment, a first instance of the application to utilize the first resources and the second resources.

12. The non-transitory machine-readable medium of claim 11, wherein the operations further comprise:

subsequent to the deploying, monitoring a performance of an execution of the first instance of the application; and providing an indication of a performance, a health, or a combination thereof, of a communication network or system based on the monitoring.

13. The non-transitory machine-readable medium of claim 11, wherein the operations further comprise:

selecting third resources of a second cloud computing network to support the application, the second cloud computing network being different from the first cloud computing network;

based on the selecting of the third resources, configuring at least one resource of the third resources based on the plurality of profiles; and deploying a second instance of the application to utilize the third resources.

14. The non-transitory machine-readable medium of claim 13, wherein the operations further comprise:

generating a first entry in a registry, the first entry corresponding to the first instance of the application; and generating a second entry in the registry, the second entry corresponding to the second instance of the application.

15. The non-transitory machine-readable medium of claim 14, wherein the operations further comprise:

obtaining a user input that modifies a parameter of the first instance of the application, resulting in a third instance of the application; and replacing the first entry with a third entry in the registry, the third entry corresponding to the third instance of the application.

16. The non-transitory machine-readable medium of claim 14, wherein the first instance of the application is associated with a first set of definitions based on a use of the first resources, wherein the second instance of the application is associated with a second set of definitions based on a use of the third resources, and wherein a common set of definitions is used in conjunction with the registry in association with the first instance of the application and the second instance of the application.

17. A method, comprising:

obtaining, by a processing system including a processor, a request pertaining to an application supporting a communication network or system;

based on the obtaining of the request, establishing, by the processing system, a plurality of profiles for the application, wherein the plurality of profiles includes a first profile that defines a scope of user and component roles, a second profile that maps environment and resource ownership considerations to users, and a third profile that establishes role-based authentication and authorization responsibilities and permissions;

selecting, by the processing system, first resources of a first cloud computing network and second resources of a premise environment to support the application;

based on the selecting of the first resources and the second resources, configuring, by the processing system, at least one resource of the first resources and at least one resource of the second resources based on the plurality of profiles; and deploying, by the processing system and via a control plane that is common to the first cloud computing network and the premise environment, a first instance of the application to utilize the first resources and the second resources.

18. The method of claim 17, further comprising:

subsequent to the deploying, monitoring, by the processing system, a performance of an execution of the first instance of the application; and providing, by the processing system, an indication of a performance, a health, or a combination thereof, of the communication network or system based on the monitoring.

19. The method of claim 17, further comprising:

selecting, by the processing system, third resources of a second cloud computing network to support the application, the second cloud computing network being different from the first cloud computing network;

based on the selecting of the third resources, configuring, by the processing system, at least one resource of the third resources based on the plurality of profiles; and deploying, by the processing system, a second instance of the application to utilize the third resources.

20. The method of claim 17, wherein the plurality of profiles includes a monitoring profile that includes a specification of when to perform a test, under what conditions to perform a test, and sampling rates to use for testing purposes.

* * * * *